W. M. MIXER & J. C. De La VERGNE.
Pipe Joint and Coupling.

No. 220,407.　　　　Patented Oct. 7, 1879.

WITNESSES
Louis E. DeLaVergne
Stephen Byrnes

INVENTORS
William M. Mixer,
John C. De La Vergne

UNITED STATES PATENT OFFICE.

WILLIAM M. MIXER AND JOHN C. DE LA VERGNE, OF NEW YORK, N. Y.

IMPROVEMENT IN PIPE JOINTS AND COUPLINGS.

Specification forming part of Letters Patent No. 220,407, dated October 7, 1879; application filed January 30, 1879.

*To all whom it may concern:*

Be it known that we, WILLIAM M. MIXER and JOHN C. DE LA VERGNE, of the city, county, and State of New York, have invented a new and Improved Joint and Coupling for Metal Pipes; and do declare that the following is a full, clear, and exact description of the same, reference being had to the accompanying drawings.

The nature of our invention relates to an improvement in joints and couplings of metal pipes, especially adapted for all purposes where absolutely tight joints are required for holding liquids and gases.

In all screw-joints of iron pipes when used for containing air, volatile gases, or liquids under pressure, great difficulty has been found in making them tight. On our plan a joint can be made and the pipes united as a continuous metal, having all the merits of the screwed, leaded, and soldered joint combined.

Figure 1:
Figure 1:
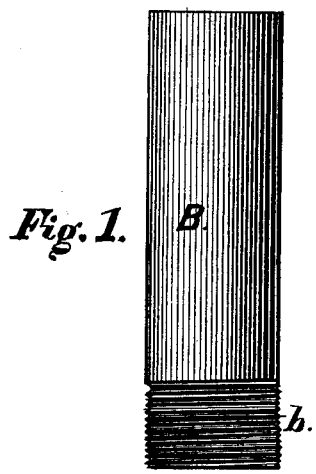
Figure 1:
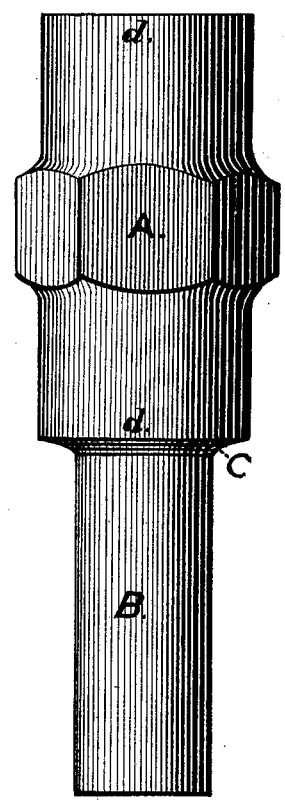
Figure 2:
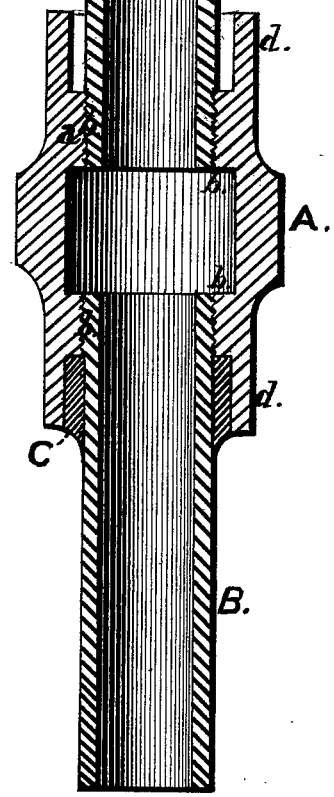

In the drawings, Figure 1 is a perspective view; Fig. 2, a cross-section.

A represents a pipe-coupling, having two female screw-threads, *a a*, cut in the aperture, and also having two sleeves or recesses, *d d*, projecting outward from the screw-threads *a a*. B B are pipes, each having a male screw-thread, *b b*, cut on their ends, corresponding with the female screw-threads *a a* in the coupling A, and a portion thereof corresponding in length with the sleeves *d d*, coated with an amalgamating or soldering metal.

When the pipes and coupling are screwed together the sleeves *d d* project outward and over the pipes, and, being somewhat larger than the pipes, grooves are formed, to be filled with the soldering metal in the form of rings, as shown at *c*. This ring may be of any desired size or form, and suited to different pipes, provided always it is large enough to make a perfect joint.

Fig. 1 shows the lower joint complete and the pipe detached in the upper one. Fig. 2, in section, shows the lower joint complete and the upper joint screwed in the coupling, with the amalgamating or soldering metal left out to more clearly demonstrate the method of making the joint.

The inner surface of the sleeves *d d* and the adjacent surfaces of the pipes B B are previously prepared with a coating of amalgamating or soldering metal, which consists of lead, tin, and zinc, or any of their compounds. Other metals easily fused may also be used either alone or in composition, but must always be adapted to the purpose for which the pipes are to be used; or they may be galvanized before or after being screwed together.

To complete these joints they may, after being screwed together, be dipped in molten metal, or the molten metal may be poured over the joints until adhesion of the parts is perfect, or any of the ordinary methods of soldering can be used that will cause the soldering metal to adhere perfectly to the sleeves and pipes. This joint is adapted to all forms of pipe-connections and socket-joints, such as couplings, elbows, tees, bends, unions, and flanges.

Having thus described our invention, what we claim as new, and desire to secure by Letters Patent, is—

1. As a new article of manufacture, a pipe coupling or socket having its ends recessed, and coated with an amalgamating or soldering metal, substantially as described.

2. A pipe coupling or socket provided with screw-threads, and a recess outside of said screw-threads, coated with an amalgamating or soldering metal, substantially as described.

3. The combination of a socket or coupling having recessed ends, coated with an amalgamating or soldering metal, a pipe having its ends beyond and outside of the screw-threads likewise coated, and a filling of amalgamating metal, substantially as described.

4. The combination of a coupling or socket having screw-threads, and a recess outside of said screw-threads, coated with an amalgamating or soldering metal, a pipe having its ends screw-threaded, and a portion outside of or beyond said screw-threads coated with an amalgamating or soldering metal, and a filling of amalgamating or soldering metal, substantially as described.

WILLIAM M. MIXER.
JOHN C. DE LA VERGNE.

Witnesses:
LOUIS E. DE LA VERGNE,
STEPHEN BYRNES.